United States Patent
Yano et al.

(10) Patent No.: US 6,950,746 B2
(45) Date of Patent: Sep. 27, 2005

(54) NAVIGATION APPARATUS AND REROUTING METHOD

(75) Inventors: Kenichiro Yano, Tokyo (JP); Motoyuki Yamashita, Tokyo (JP); Koji Koga, Tokyo (JP); Motohiko Takayanagi, Tokyo (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/308,113

(22) Filed: Dec. 3, 2002

(65) Prior Publication Data

US 2004/0204846 A1 Oct. 14, 2004

(30) Foreign Application Priority Data

Dec. 4, 2001 (JP) .................................... P2001-369814
Apr. 26, 2002 (JP) .................................... P2002-127529

(51) Int. Cl.[7] .......................... G01C 21/00; G06G 7/78; G06F 165/00
(52) U.S. Cl. .................. 701/210; 701/202; 340/988
(58) Field of Search ............................... 701/202, 210, 701/208, 209; 340/988, 990, 995.1, 995.22, 995.19; 342/357.09, 357.13; 73/178 R (56) References Cited

U.S. PATENT DOCUMENTS

| 5,311,434 | A | * | 5/1994 | Tamai | 701/210 |
|---|---|---|---|---|---|
| 5,369,588 | A | * | 11/1994 | Hayami et al. | 340/995.19 |
| 5,675,492 | A | * | 10/1997 | Tsuyuki | 701/210 |
| 5,911,775 | A | * | 6/1999 | Tanimoto | 701/210 |
| 5,928,307 | A | * | 7/1999 | Oshizawa et al. | 701/210 |
| 6,256,579 | B1 | * | 7/2001 | Tanimoto | 701/201 |
| 6,418,373 | B1 | * | 7/2002 | Omi et al. | 701/209 |
| 6,594,580 | B1 | * | 7/2003 | Tada et al. | 701/211 |
| 2001/0004725 | A1 | * | 6/2001 | Yagyu | 701/210 |

* cited by examiner

*Primary Examiner*—Thomas G. Black
*Assistant Examiner*—Dalena Tran
(74) *Attorney, Agent, or Firm*—Sughrue Mion, PLLC (57) ABSTRACT

An navigation apparatus records a deviation point as a new search point for activating a rerouting function during a route guidance process. When the deviation point exists along or near a set route, it is predicted that a vehicle will travel away from the set route at the deviation point. When a current location is within a predetermined distance from the deviation point, the rerouting function is activated to automatically search for a new route starting from the deviation point.

18 Claims, 6 Drawing Sheets

NAVIGATION APPARATUS AND REROUTING METHOD

The present disclosure relates to the subject matter contained in Japanese Patent Applications No. 2001-369814 and No. 2002-127529 filed Dec. 4, 2001 and Apr. 26, 2002 respectively, which are incorporated herein by reference in their entirety.

BACKGROUND OF THE INVENTION

1. Field of the Invention

The present invention relates to a navigation apparatus for setting and displaying a route leading from a current point (a specific point or a predetermined point etc.) to a destination point so as to assist driving of a mobile unit such as vehicle.

2. Description of the Related Art

Conventionally, it is required for a navigation apparatus that is mounted on a mobile unit such as car or ship, or is carried by a pedestrian, to accurately determine a current location and traveling direction. Also, it is required to display a map data corresponding to the current location, a location mark, a mark indicating the traveling direction leading to a destination point and other information requested by a user on a device such as display device, appropriately and rapidly.

A conventional navigation apparatus to be mounted on a car sets a route based on various input data such as starting and destination point and relevant map data, and calculates directions and distances, relative to the current location of the car, to provide guidance for the route in the forward direction.

Another conventional navigation apparatus includes a rerouting function for automatically performing a search for a new route from a current location to a predetermined destination point, when the location of a user vehicle traveling a designated route deviates from that route, or when data is obtained indicating that traffic along the route ahead is congested.

A general navigation apparatus searches a route depending upon not only a starting point (when a specific point is not designated, the position of the user vehicle is automatically set as the starting point) and a destination point (some points to be passed may be set between the starting point and the destination point), but also search conditions such as road data including distances, road widths, straight stretches and tolls, and traffic data including traffic congestion and road construction. The navigation apparatus designates a route that appears to be the optimal one, automatically or by user's selection.

However, there is a case where a better route exists depending upon time of day, the day of the week, the weather, or user's experience. In such a case, it may be possible to shorten the driving time or to ease the driving by selecting the better route even though the driving distance become longer than that of the route designated by the navigation apparatus. Since the conventional navigation apparatus does not take into account such user's experience and knowledge during the route setting process, an optimal route that is consonant with the user's intent can not be designated.

In case where the better route exists, the rerouting function is not activated in the conventional navigation apparatus until a user intentionally deviates from the designated route. Thus, during the period beginning with the deviation from the preset route and continuing until the search results are displayed, the user must drive without the route guidance. To avoid this phenomenon, the user must intentionally and manually activate the rerouting function before the user vehicle diverges from the designated route. Also, it is required for the user to designate points to be passed, turning direction and roads to be passed.

SUMMARY OF THE INVENTION

An object of the present invention is to provide a navigation apparatus, rerouting method and a storage medium in which the rerouting method is recorded that employ a recorded deviation point as an activating factor for the rerouting function, so that a route guide in consonance with the intent of the user is performed.

According to an aspect of the present invention, there is provided a navigation apparatus comprising: a start point input part for inputting a start point; a destination point input part for inputting a destination point; a route setting part for setting a route from the start point to the destination point based on input data and various other data including map data; and a display part for displaying the route, wherein the navigation apparatus provides a route guidance from the start point to the destination point, the navigation apparatus has a rerouting function for performing a search again during the route guidance, wherein the navigation apparatus further comprises a deviation point recording part for recording a deviation point as a search point for activating the rerouting function, and wherein the rerouting function is activated when a current location is within a predetermined distance from the deviation point.

According to another aspect of the present invention, there is provided a navigation apparatus comprising: a start point input part for inputting a start point; a destination point input part for inputting a destination point; a route setting part for setting a route from the start point to the destination point based on input data and various other data including map data; and a display part for displaying the route, wherein the navigation apparatus provides a route guidance from the start point to the destination point, the navigation apparatus has a rerouting function for performing a search again during the route guidance, wherein the navigation apparatus further comprises a route segment recording part for recording a route segment set in advance, and wherein the rerouting function is activated when a current location is within a predetermined distance from the route segment.

According to the configuration of the present invention, the rerouting function can be automatically activated at a time desired by the user, and a new route can be set up.

DETAILED DESCRIPTION OF THE PREFFERED EMBODIMENTS

The present invention will be described below in detail with reference to the accompanying drawings.

Figure 1:
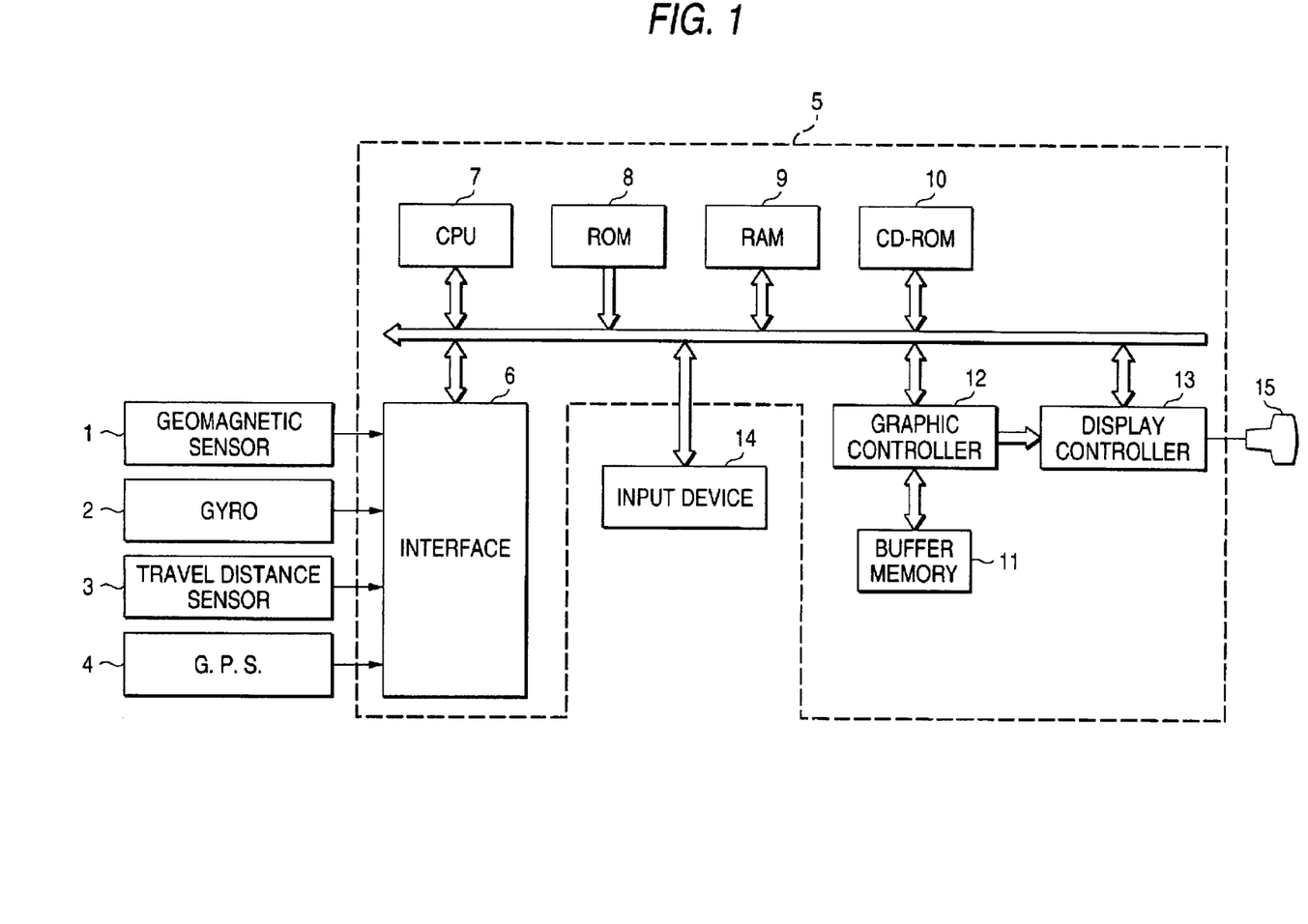
FIG. 1 is a diagram schematically showing a basic configuration of a vehicle-mounted navigation apparatus according to the present invention.

FIG. 1 is a diagram showing the general, basic configuration of an in-vehicle navigation apparatus. The in-vehicle navigation apparatus comprises: a magnetic sensor 1 for detecting an absolute azimuthal angle data of a vehicle based on geomagnetism; a gyro sensor 2 serving as an angular speed sensor for detecting an angular speed accompanied by a change in the traveling direction of the vehicle; a traveling distance sensor 3 for determining whether the vehicle is moving or stopped by detecting data such as speed pulse and for detecting traveling speed and traveling distance of the vehicle; a GPS sensor 4 for performing computations using radio waves received from multiple GPS satellites to calculate data such as latitude, longitude, altitude and traveling direction of the vehicle; a main body 5 for performing a variety of processes including calculations and control; an input device 14 for inputting instructions to the main body 5; and a display device 15 such as liquid crystal display device or CRT.

The main body 5 includes: an interface 6 for receiving data from the magnetic sensor 1, the gyro sensor 2, the traveling distance sensor 3 and the GPS sensor 4; a CPU (Central Processing Unit) 7 for performing various operations based on programs; a ROM (Read Only Memory) 8 in which processing programs and various other required data are written; a RAM (Random Access Memory) 9 used for writing or reading of data required for the execution of the program; a recording medium 10 such as CD-ROM in which data such as map data is recorded; a buffer memory 11 constituted by a member such as V-RAM (video RAM) to be a frame buffer that is used for the temporary storage of image data that is expanded for immediate display; a graphic controller 12 for drawing graphic data such as map data received in accordance with instructions of the CPU 7 in the buffer memory 11, and for outputting the drawing data as image data; and a display controller 13 for receiving the image data output from the graphic controller 12 and for controlling the display of images on the display device 12.

The thus structured navigation apparatus performs the following process and serves as a current location display means when the main body 5 is activated. First, a map display data and a current location mark display data are read from the recording medium 10 and are stored in the RAM 9. Then, the latitude and the longitude data and the traveling direction data are obtained as the current location data from the GPS sensor 4. The map data corresponding to the current location is then read from the RAM 9, and is transmitted to the graphic controller 12, and the current map is displayed on the display device 15. Further, the process for displaying the current location mark on the map is performed based on the current location data and the traveling direction data, while the current location data and the traveling direction data are periodically read from the GPS sensor 4 to update the display position and the direction of the current location mark and, as needed, update the map being displayed. In addition, the data output by the magnetic sensor 1, the gyro sensor 2 and the traveling distance sensor 3 are read periodically, and based on these data, a predetermined calculation is performed to obtain the current location and the traveling direction. Then, the obtained data is compared with the data received from the GPS sensor 4, and is adjusted to correct errors between the two data sets.

Another important function of the navigation apparatus is a route guidance process. For the route guidance process, the main body 5 first accepts the setting input for a route, and following the input of a destination point, retrieves (searches for) routes to that destination under search conditions such as road information including distances, road widths, straight stretches and tolls, and traffic information including congested traffic locations and road construction sites. These road information and traffic information are obtained from the latitudes and longitudes of the current location (when a specific start point is not designated, the location of the user vehicle is automatically set as the start point) and the destination point, and other various data obtained from the recording medium 10 or from communication means. Of the routes retrieved, the one that appears to provide the optimal conditions is automatically designated (or is selected by a user) as the set route. Subsequently, the direction and the distance to target points such as intersections are calculated as the user vehicle travels from the start point, and the target point data can be displayed along with the route guide.

The main body 5 also includes a rerouting function for automatically retrieving (searching for) a new route from the current user vehicle location to the destination point, when the current location deviates from the set route during the route guidance process, or when data is detected indicating that traffic is congested ahead along the set route.

A feature of the navigation apparatus of this invention resides in an activation factor for the rerouting function. The CPU 7 in the main body 5 performs the following process.

(First Embodiment)

An explanation will now be given, while referring to FIGS. 2 and 3, for a navigation apparatus according to a first embodiment that employs a deviation point as the activation factor for the rerouting function.

In the first embodiment, the RAM 9 serves as deviation point recording means and travel frequency data recording means.

The navigation apparatus of this embodiment includes a point recording function for recording the deviation point in the RAM 9 that is used as the deviation point recording means. The deviation point is a point where the user vehicle is deviated from the set route during the route guidance process. In the next time of route setting, if that deviation point is on or near the route that is set newly, the rerouting function is activated when the user vehicle approaches to the deviation point and is within a predetermined distance from the deviation point. For example, when the deviation point is within N km ahead on the route or within a forward range defined by a radius of N km, the rerouting function is activated so as to retrieve a new route automatically so that the deviation point is included in the new route.

The travel frequency data including the actual path traveled by the vehicle from the deviation point to the set route or to the destination point, and the traveling frequency are stored in the RAM 9, which serves as the travel frequency data recording means. When there routing function is activated automatically, the travel frequency data such as the path traveled and the traveling frequency are added to the search objective of the rerouting function.

The process for activating the rerouting function and the data recording process that serves as the activation factor will be described.

Figure 2:
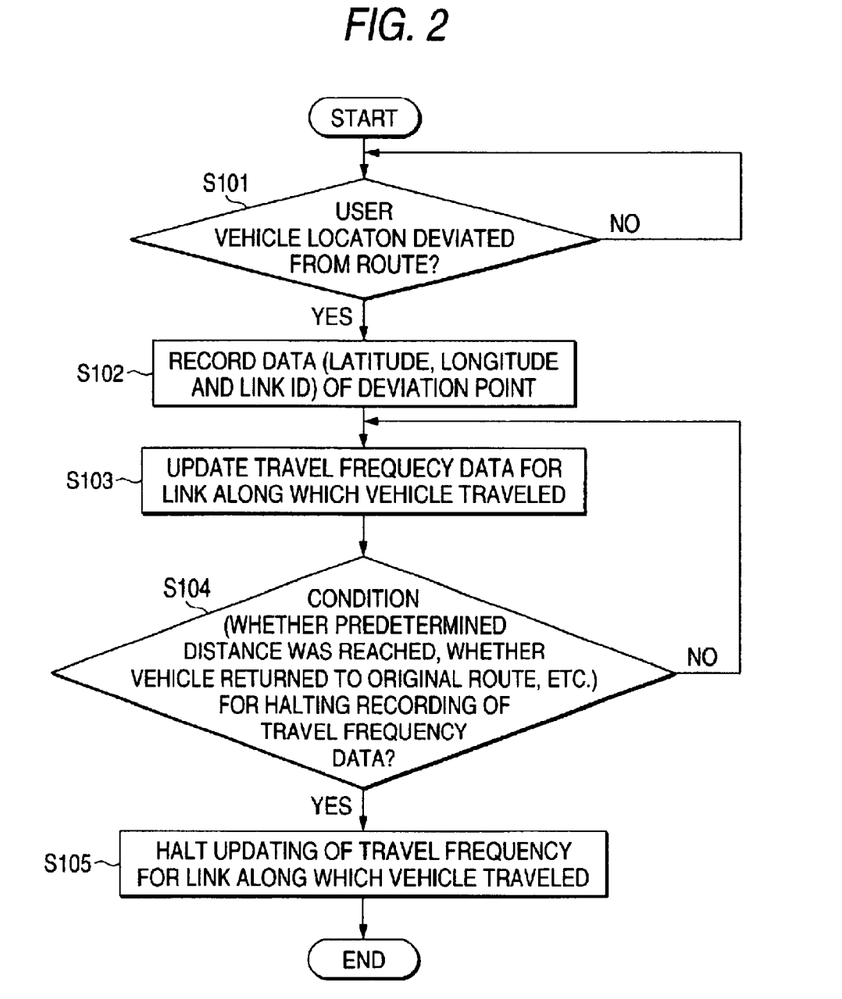
FIG. 2 is a flowchart for a data recording processing that serves as an activation factor in a first embodiment.

FIG. 2 is a flowchart for the data recording process that serves as the activation factor. In this case, it is assumed that the user vehicle is being guided along the set route. As is shown in FIG. 2, a check is performed to determine whether the user vehicle location has been deviated from a set route (step 101). When the user vehicle location has not been deviated from the route, program control is set to a wait state. When it is ascertained that the user vehicle location has been deviated from the route, program control advances to step 102 and the data for the point at which the user vehicle location was deviated from the route, such as the latitude and the longitude or the link ID, is recorded in the deviation point recording means (RAM 9). Then, program control is shifted to the next step. At steps 103 to 105, until a recording halt condition shown at step 104 is satisfied, the travel frequency data, i.e., the path along which the vehicle actually traveled from the deviation point and the traveling frequency which indicates how many times the vehicle traveled the path, are recorded in the RAM 9, which is the travel frequency data recording means. The recording halt condition shown at step 104 includes such that the user vehicle location has returned to the original route or the vehicle has arrived at the destination point or has traveled a predetermined distance.

In this processing, the path traveled and the traveling frequency are employed as the example of travel frequency data that serve as the activation factor. However, there are cases where the driving time can be shortened or driving is easy for the driver depending upon the time, the day of the month, the day of the week or the weather, even when taking a detour. When these data are recorded and utilized, an appropriate process, consonant with the user's intent, can be performed, such that when the road along a route is narrow or the visibility along the route is poor, a driver can avoid that route in the nighttime or in bad weather.

The rerouting function activation process using such activation factor will now be described.

Figure 3:
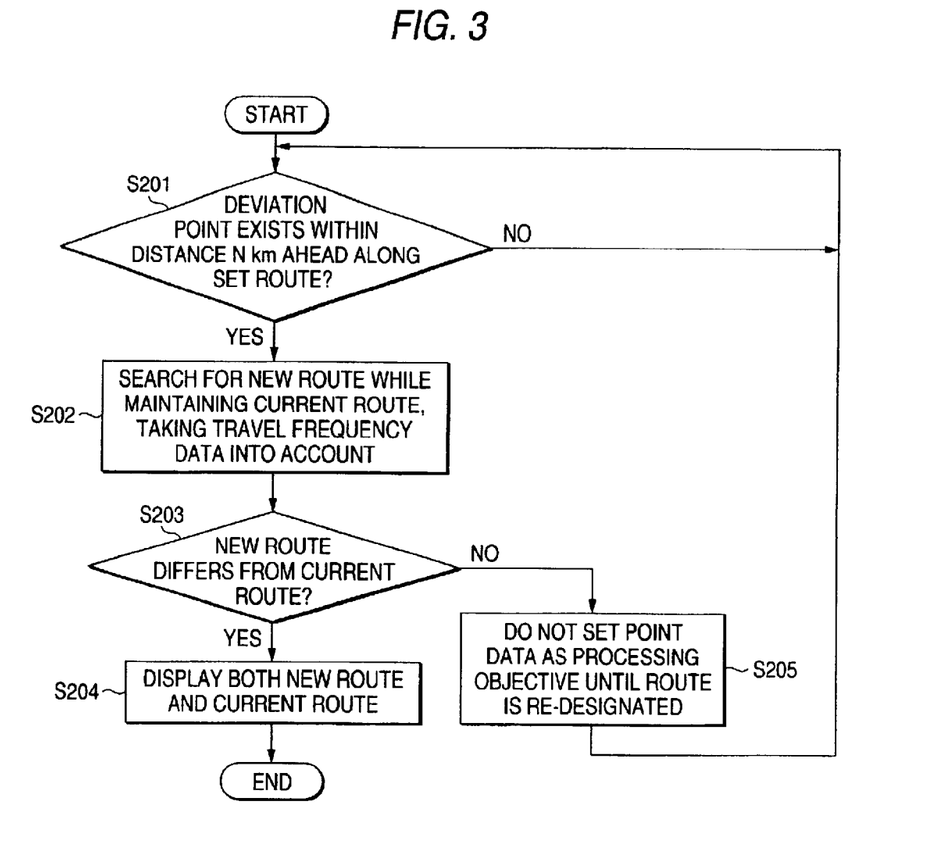
FIG. 3 is a flowchart for a rerouting function activation processing in the first embodiment.

FIG. 3 is a flowchart showing the rerouting function activation processing. For this processing also, it is assumed that a user vehicle is being guided along a set route. As is shown in FIG. 3, firstly a check is performed to determine whether there is a data within a distance N km ahead along the set route, which indicates that the user vehicle location was deviated from the route in the past (step 201). The data used at this step is deviation point data that is recorded in the deviation point recording means (RAM 9) at step 102. When it is ascertained that data for a point, within a distance N km ahead along the set route (within a forward range defined by a radius of N km), whereat the vehicle was deviated from the route is not available, program control is shifted to the wait state. When it is ascertained that data for a point, within a distance N km ahead along the set route (within a forward range defined by a radius of N km), whereat the vehicle was deviated from the route in the past is available, program control advances to step 202. At step 202, while the set route along which the vehicle is being guided is maintained (presented on the display 15), the rerouting function of the CPU 7 is activated to search for a new route (a candidate route). At this time, the travel frequency data recorded at steps 103 to 105 are added as a search condition, and while taking this data into account, a search for a new route is performed.

At step 203, a check is performed to determine whether the new route obtained at step 202 differs from the set route along which the vehicle is currently being guided. When the new route is the same as the current set route, program control advances to step 205, and point data are not set as an processing objective until the route is re-designated (or until the user activates the rerouting function). When the new route differs from the current set route, program control advances to step 204 and both the new route and the current set route are displayed on the screen of the display 15.

Thereafter, either the new route or the set route may be selected automatically based on the travel frequency data or manually by the user. Or both these routes may be displayed until the user vehicle is located on either route, and when the user vehicle is located on one of the routes, it can be determined that that route has been selected.

As is described above, according to this embodiment, the point is recorded whereat the user vehicle is deviated from the set route while being guided along the route. As long as this deviation point is recorded along or near the set route, the next time, i.e., when the user drives to the same destination or when the same route is employed to drive to a different destination, the rerouting function will be activated when the user vehicle approaches to within a predetermined distance of the deviation point, and the search for a route beginning at the deviation point will be begun automatically. Thus, when it is predicted based on historical data that the vehicle will veer off and travel away from the route set by the navigation system, the rerouting function is automatically activated for setting a new route before the vehicle reaches the deviation point. As a result, a route consonant with the user's intent can be set, and efficient route guidance can be provided for the user.

Further, the navigation apparatus of the first embodiment includes a point recording function whereby a point whereat a vehicle is deviated from a set route is automatically recorded as a deviation point in the RAM 9, which serves as the deviation point recording means. In the next time of route setting, it can be predicted based on the past record that the vehicle will travel away from the route set by the navigation apparatus when a deviation point exists along or near the route being set, and the rerouting function will automatically be activated to set a new route before the vehicle reaches the deviation point. As a result, route guidance consonant with the user 's desire can be provided.

Further, when the user vehicle is deviated from the set route, the travel frequency data, which indicates the frequency whereat the vehicle actually traveled away from the deviation point to the set route or the destination point, is recorded in the RAM 9 serving as the travel frequency recording means. In the next time of route setting, the travel frequency data is added to the search condition for the rerouting function when the deviation point exists along or near a route being set and travel frequency data for the deviation point is also recorded. As a result, a route consonant with the desires of the user can be set, and more effective route guidance can be provided.

In the first embodiment, the point whereat a vehicle is deviated from a set route is automatically recorded as a deviation point. However, an arbitrary point (a point along the set route or at a distance from the set route) may be recorded as a deviation point through registration performed by a user. In this case, when the vehicle travels along a route along which the user has not driven, e.g., when the user drives to an unknown location, the user need only record a deviation point based on data obtained from a specific information source such as the mass communication media or friends or relatives. As a result, since the rerouting function is activated at the recorded deviation point, route guidance consonant with the user's intent can be provided.

(Second Embodiment)

Figure 4:
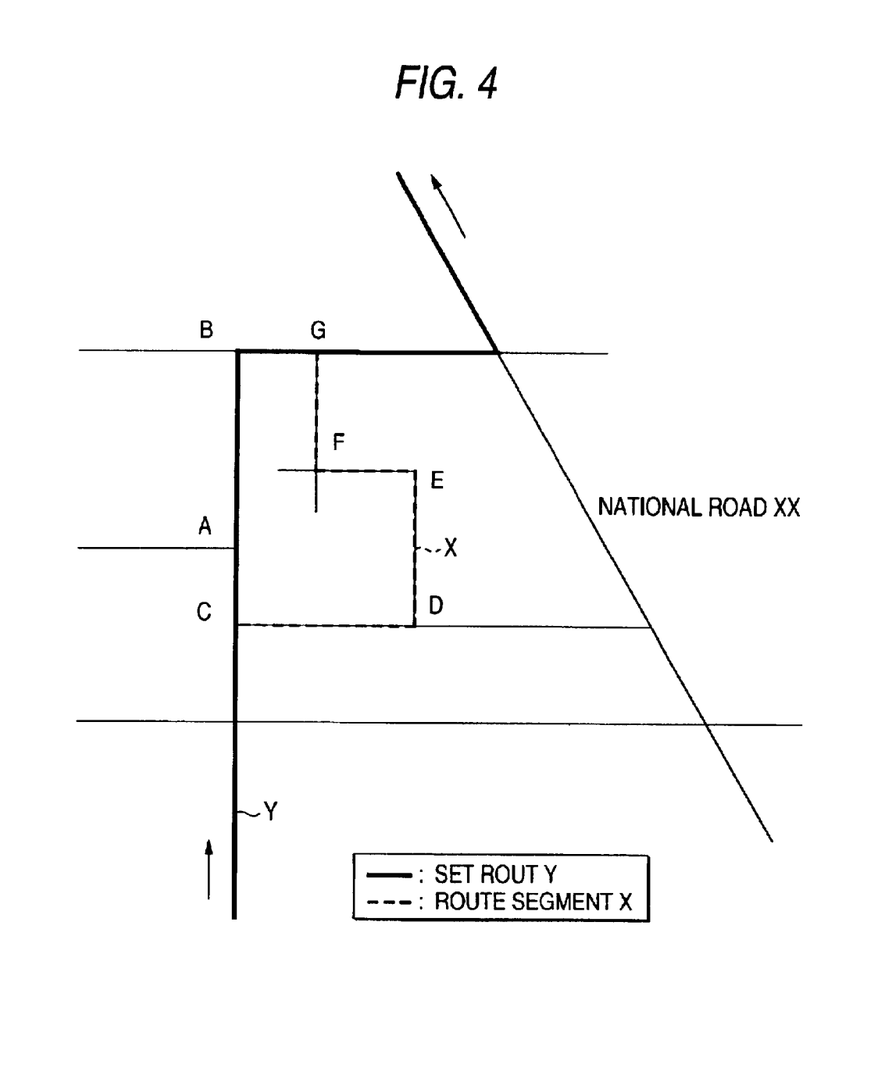
FIG. 4 is a conceptual diagram showing a state wherein a route segment is set in a second embodiment.
Figure 5:
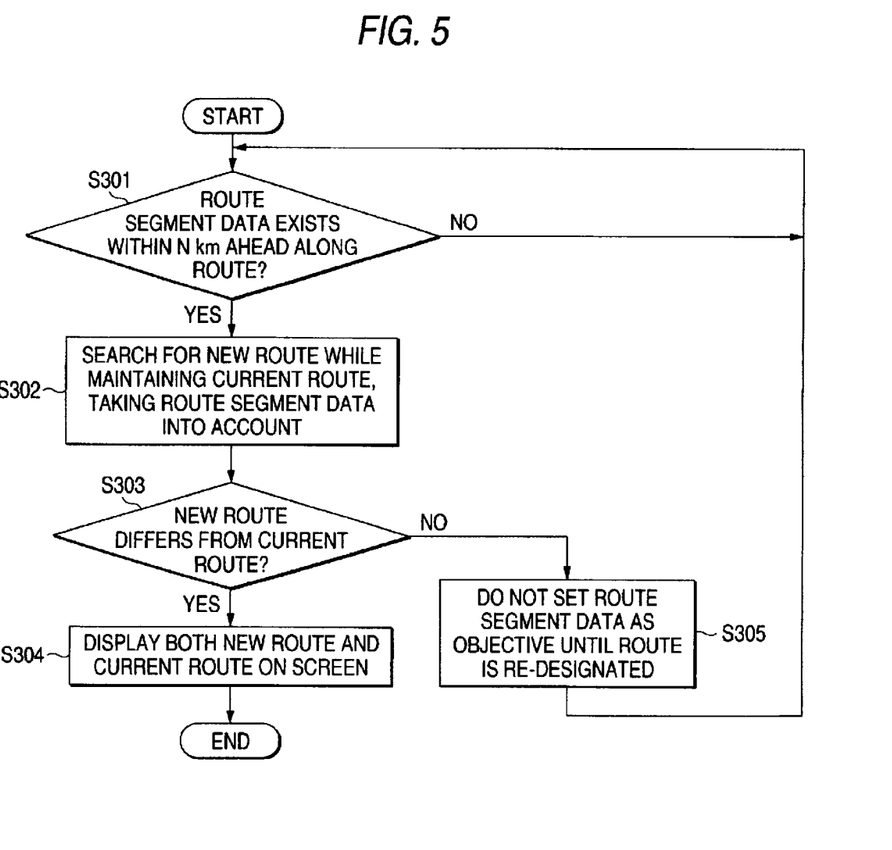
FIG. 5 is a flowchart for a rerouting function activation processing in the second embodiment.

Referring to FIGS. 4 and 5, a second embodiment wherein a route segment that is set in advance is employed as an activation factor for the activation of the rerouting function will be described.

In the second embodiment, the RAM 9 functions as route segment recording means.

Specifically, in the navigation apparatus of the second embodiment, a route segment that is set in advance is recorded in the RAM 9, which is the route segment recording means. When the route segment is present along or near the set route, and when the route segment is within a predetermined distance of a current location (the predetermined distance is determined by the search time required for the rerouting function; e.g., within a distance N km ahead along the set route, or within a forward range defined by a radius of N km), the rerouting function is automatically activated to perform a search for a route.

As is described above, for rerouting, a route segment that has been set in advance is added to the search conditions for the rerouting, while road conditions such as distances, widths and straight stretches and tolls, traffic data such as traffic congestion and road construction, and the time, the day of the month, the day of the a week and the weather are taken into account.

Since the route segment is set in advance in the second embodiment, the route segment maybe employed as a first candidate route by the rerouting function, while taking into account the assume that the user desires to travel the route segment.

An explanation will now be given for the data recording processing, which is an activation factor for the activation of the rerouting function for the second embodiment.

First, a route segment that constitutes an activation factor is recorded in the route segment recording means (RAM 9). Specifically, by using an input device 14, the path of the route segment can be designated on a map provided on the display 15, and can be recorded in the route segment recording means (RAM 9). When through experience the user is aware that there will be heavy traffic at intersections A and B on the map shown in FIG. 4, the user designates and records, as a route segment, the path C-D-E-F-G, which is indicated by a broken line X.

The rerouting function activation processing will now be described by employing the activation factor.

FIG. 5 is a flowchart for the rerouting function activation processing. For this processing, it is assumed that a user vehicle is being guided along a set route. As is shown in FIG. 5, a check is performed to determine whether data for a route segment is present within a distance N km ahead along the set route (within a forward range defined by a radius of N km) (step 301).

The data used in this processing is the data for a route segment that has been recorded in advance in the route segment recording means (RAM 9). Specifically, at step 301, a check is performed to determine whether data for the end point of the route segment or data for a point whereat the set route and the route segment intersect so that they communicate with each other, is present along the set route.

When data for the route segment is not present within a distance N km ahead along the set route (within a forward range defined by a radius of N km), program control is shifted to a wait state. When data for the route segment is present within the distance N km ahead along the set route (within a forward range defined by the radius of N km), program control advances to step 302. At step 302, while the set route along which the vehicle is currently being guided is maintained (the set route is presented on the display 15), the rerouting function of the CPU 7 is activated to search for a new route (a candidate route). At this time, the data for the route segment that has been recorded in advance is added to the search condition, and a new route is retrieved while taking these data into account.

At step 303, a check is performed to determine whether the new route obtained at step 302 differs from the set route that is currently being employed. When the new route is the same as the set route, program control is shifted to step 305, and the data for the route segment is not set as processing objective until a route is re-designated (or until the user activates the rerouting function). When the new route differs from the set route that is currently employed, program control advances to step 304, and both the new route and the set route are displayed on the screen of the display 15.

Based on the data for the route segment, the new route or the set route may be selected either automatically or manually by the user. Further, these two routes may be displayed until the user vehicle is located at either of the routes. When the user vehicle has reached a route, the route may be identified as the selected route.

As is described above, according to the second embodiment, a route segment that has been set in advance is recorded in the route segment recording means (RAM 9), and when the route segment is present along or near the set route and a user vehicle is within a distance N km ahead along the set route (within a forward range defined by the radius of N km), the rerouting function is activated to add the route segment as one of the search conditions, and to automatically search for a new route. Therefore, since it is predicted that the vehicle will travel away from the set route because the route segment has been designated in advance, the rerouting function can be automatically activated to designate a new route before the vehicle reaches the route segment. Thus, a route can be set that is consonant with the desires of the user, and effective route guidance can be provided.

Specifically, when from experience a user is aware that the traffic will be heavy at intersections A and B on the map shown in FIG. 4, the user can designate and record, as a route segment, the path C-D-E-F-G indicated by the broken line X. Therefore, as the user vehicle operated by that user is traveling along the set route indicated by a solid line Y and reaches a point whereat an intersection C, which is an end point both for the set route and the route segment, is within a distance N km ahead along the set route (within a forward range defined by the radius of N km), the rerouting function is automatically started.

Further, when the end point of the route segment is present along the set route, or when the set route and the route segment intersect so that they communicate, the rerouting function is started automatically. Therefore, the direction in which the user vehicle is traveling can be easily changed, from the set route to the route segment, and rerouting consonant with the current situation can be provided.

Furthermore, since the route segment is regarded as the candidate route for the rerouting function, a route that is more appropriate for the user can be set while taking into account the user's desire to travel the route segment. As a result, effective route guidance can be provided.

In this embodiment, an arbitrary path for a route along which the user desires to travel has been designated and recorded as an example of route segment that serves as an activation factor. However, a specific portion of a road, such as national road XX or Bypass XX, may be designated as an activation factor because the road so designated is wide and easy to drive on.

Figure 6:
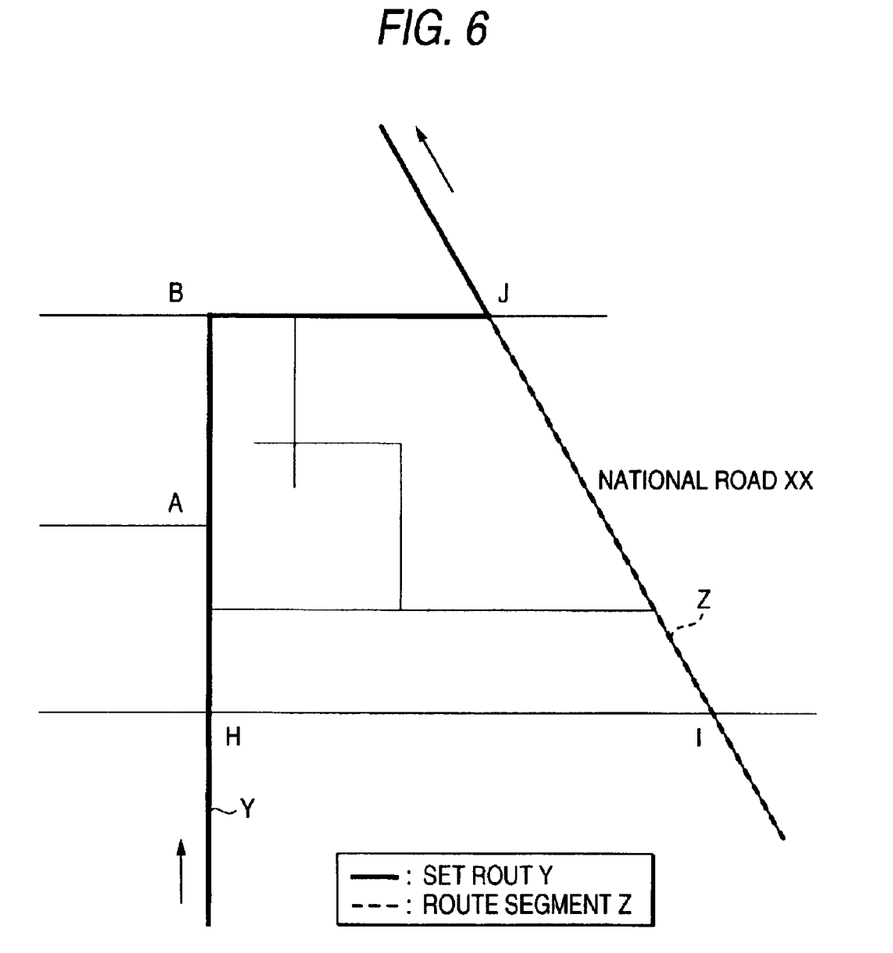
FIG. 6 is a conceptual diagram showing a state wherein a route segment is set in a third embodiment.

On the map shown in FIG. 6, national road XX is designated as a route segment, as indicated by broken line Z, and be recorded in the route segment recording means (RAM 9). In this case, when through experience the user is aware that the traffic will be heavy at intersections A and B, on the map in FIG. 6, the user need only designate and record national road XX as the route segment indicated by the broken line Z. Then, as the user vehicle is traveling along the set route indicated by the solid line Y and reaches a location within a distance of N km from the route segment indicated by the broken line Z (within a forward range defined by the radius of N km), the rerouting function is automatically activated and the route H-I-J is displayed as a candidate route. In this manner, the same effects can be obtained as were described previously.

To record a route segment, the user may designate an arbitrary route segment as in the previous explanation, or data for a route segment may be obtained from a recording medium 10 such as a CD-ROM, or from communication means, and can be recorded in the route segment recording means (RAM 9).

In the above described embodiments, the number of new routes that can be obtained and displayed by the rerouting function is not specified. However, multiple routes may be displayed in the descending order of their recorded traveling frequencies, so that the selections available to a user can be extended.

As is described above, the navigation apparatus of the invention can provide route guidance consonant with the desires of a user.

What is claimed is:

1. A navigation apparatus comprising:
    a start point input part for inputting a start point;
    a destination point input part for inputting a destination point;
    a route setting part for setting a route from the start point to the destination point based on input data and various other data including map data; and
    a display part for displaying the route,
    wherein the navigation apparatus provides a route guidance from the start point to the destination point, the navigation apparatus has a rerouting function for performing a search again during the route guidance,
    wherein the navigation apparatus further comprises a deviation point recording part for recording a deviation point as a search point for activating the rerouting function, and
    wherein the rerouting function is activated when a current location is within a predetermined distance from the deviation point.

2. A navigation apparatus according to claim 1, wherein the deviation point recording part has a point recording function for automatically recording a point from which the current location begins to deviate from the set route as the deviation point, and
    wherein the rerouting function is activated for automatically searching for a new route when the current location is within a predetermined distance from the deviation point.

3. A navigation apparatus according to claim 1, further comprising a travel frequency recording part for recording travel frequency data, which indicates a frequency of the current location's actual traveling from the deviation point to the set route or to the destination point, when the current location is deviated from the set route,
    wherein the travel frequency data is added as a search condition for the rerouting function when the deviation point exists along or near the route being set and the travel frequency data for the deviation point is recorded.

4. A navigation apparatus according to claim 1, wherein the set route and a candidate route obtained by the rerouting function are displayed at the same time.

5. A navigation apparatus comprising:
    a start point input part for inputting a start point;
    a destination point input part for inputting a destination point;
    a route setting part for setting a route from the start point to the destination point based on input data and various other data including map data; and
    a display part for displaying the route,
    wherein the navigation apparatus provides a route guidance from the start point to the destination point, the navigation apparatus has a rerouting function for performing a search again during the route guidance,
    wherein the navigation apparatus further comprises a route segment recording part for recording a route segment set in advance, and
    wherein the rerouting function is activated when a current location is within a predetermined distance from the route segment.

6. A navigation apparatus according to claim 5, wherein rerouting is automatically started when an end point of the route segment exists on the set route or when the set route and the route segment intersect.

7. A navigation apparatus according to claim 5, wherein the route segment is regarded as a first candidate route for the rerouting function.

8. A navigation apparatus according to claim 5, wherein the set route and a candidate route obtained by the rerouting function are displayed at the same time.

9. A rerouting method for a navigation apparatus including a rerouting function for searching for a new route during a route guidance along a set route, comprising:
    recording a deviation point as a search point for the activation of the rerouting function; and
    automatically searching for a new route when a current location is within a predetermined distance from the deviation point.

10. A rerouting program for causing a computer to perform a rerouting method according to claim 9.

11. A recording medium on which is recorded a rerouting program according to claim 10 that is readable by a computer.

12. A rerouting method for a navigation apparatus including a rerouting function for searching for a new route during a route guidance along a set route, comprising:
    recording a route segment set in advance; and
    automatically searching for a new route when a current location is within a predetermined distance from the route segment while adding the route segment as a search condition.

13. A rerouting program for causing a computer to perform a rerouting method according to claim 12.

14. A recording medium on which is recorded a rerouting program according to claim 13 that is readable by a computer.

15. A navigation apparatus, comprising:
    an input circuit that inputs a starting point and a destination point;
    a control circuit that determines a route from the starting point to the destination point; and
    a display that displays the route,
    wherein the control circuit provides a route guidance from the starting point to the destination point, and
    wherein the control circuit determines an alternative route when a current location of the navigation apparatus is within a predetermined distance before reaching a deviation point, and
    wherein the deviation point is a point of past deviation from the route.

16. A navigation apparatus according to claim 15, wherein the deviation point is saved by the control circuit and the control circuit automatically searches for the alternative route when the current location is within the predetermined distance from the deviation point.

17. A navigation apparatus according to claim 15, further comprising a recording circuit that records travel frequency data, which indicates a frequency of traveling from the deviation point to the set route or to the destination point, wherein the travel frequency data is a search condition for the alternative route.

18. A navigation apparatus according to claim 15, wherein the set route and the alternative route are displayed at the same time.

* * * * *